United States Patent [19]

McCollor et al.

[11] Patent Number: 5,277,693
[45] Date of Patent: Jan. 11, 1994

[54] FLIGHT ACTIVATED ANTI-G VALVE (FAAGV)

[75] Inventors: Donald G. McCollor, Springboro; George Potor, Fairborn, both of Ohio

[73] Assignee: The United States of America as represented by the Secretary of the Air Force, Washington, D.C.

[21] Appl. No.: 348

[22] Filed: Jan. 4, 1993

[51] Int. Cl.$^5$ .................................................. B64D 47/00
[52] U.S. Cl. ............................... 600/19; 251/129.03; 137/39
[58] Field of Search ............................ 600/19–20; 2/2.1 A; 251/129.03; 137/39, 51

[56] References Cited

U.S. PATENT DOCUMENTS

| | | | |
|---|---|---|---|
| 2,789,556 | 4/1957 | Clark et al. | 600/19 |
| 3,106,203 | 10/1963 | Mayo et al. | 600/19 |
| 3,734,078 | 5/1973 | Cramer et al. | 600/19 |
| 3,780,723 | 12/1973 | VanPatten et al. | 128/1 A |
| 4,219,039 | 8/1980 | Jaggars | 137/38 |
| 4,230,097 | 10/1980 | Beaussant et al. | 128/1 A |
| 4,243,024 | 1/1981 | Crosbie et al. | 128/1 A |
| 4,336,590 | 6/1982 | Jacq et al. | 364/418 |
| 4,534,338 | 8/1985 | Crosbie et al. | 128/1 A |
| 4,546,491 | 10/1985 | Beaussant | 2/2.1 A |
| 4,583,522 | 4/1986 | Aronne | 128/1 A |
| 4,638,791 | 1/1987 | Krogh et al. | 128/1 A |
| 4,736,731 | 4/1988 | VanPatten | 128/1 A |
| 4,821,982 | 4/1989 | Van Patten | 244/76 R |
| 4,895,320 | 1/1990 | Armstrong | 244/118.5 |
| 5,170,814 | 12/1992 | Crome | 600/19 |

*Primary Examiner*—William E. Kamm
*Assistant Examiner*—John P. Lacyk
*Attorney, Agent, or Firm*—Bernard E. Franz; Donald J. Singer

[57] ABSTRACT

A conventional mass-spring inertially controlled anti-G suit valve is modified by adding a first electrically actuated solenoid over the mass and valve spindle and a second electrically actuated solenoid over an anti-G suit exhaust port added to the modified anti-G suit valve. The first solenoid can override the inertial valve to begin filling the anti-G suit before acceleration begins. The second solenoid controls a piston to control the exhaust from the anti-G suit to achieve more precise control over the pressure inside the anti-G suit than previously possible. This precise control allows realization of other improvements suggested by the prior art which need precise control of anti-G suit pressures. Pressure transducers can be added to the anti-G suit to provide a feedback signal to a valve controller for the two solenoid valves. The feedback control loop allows the use of less expensive cost, less accurate solenoid valves.

8 Claims, 2 Drawing Sheets

FLIGHT ACTIVATED ANTI-G VALVE (FAAGV)

RIGHTS OF THE GOVERNMENT

The invention described herein may be manufactured and used by or for the Government of the United States for all governmental purposes without the payment of any royalty.

BACKGROUND OF THE INVENTION

The present invention relates generally to apparatus and methods for increasing the ability of pilots of high performance aircraft to resist high G caused unconsciousness, and more specifically to a novel improvement to anti-G suit valves that substantially increases their G-protective effectiveness.

While flying simulated or actual combat maneuvers, a fighter pilot's body undergoes very high accelerations from the rapid changes in speed and direction. These accelerations are generally expressed in units of G, equal to the acceleration of a mass at the surface of the Earth due to gravity. The accelerations of greatest concern to a pilot are those that occur along the vertical z-axis of the cockpit when the pilot pulls back hard on the aircraft control stick to accomplish a rapid climb or a fast banked turn. The pilot's oxygen-carrying blood is forced away from its regular path between the heart-lungs and the brain, and pools toward the blood vessels of his or her lower extremities. At sufficiently high G's, the pilot's field of vision narrows as blood flow to the retinas is reduced, called grayout, followed by blackout, and finally followed by loss of consciousness (called GLOC, for G induced Loss OF Consciousness) from insufficient blood flow to the brain.

Pilots fight the effects of high G's by straining maneuvers, tensing the muscles of their torso and extremities to squeeze shut the blood vessels and force blood flow to continue in the upper parts of their body. An anti-G suit helps this process by covering the pilot's legs and torso with air bladders which automatically inflate during high acceleration maneuvers to compress the blood vessels in those regions and force blood flow to continue to the brain. Because continuous compression of the blood vessels of the lower extremities is harmful, anti-G suits include an anti-G suit valve to restrict inflation only to periods of high acceleration.

The nearly instantaneous response of modern high performance jet aircraft causes acceleration onset rates (dG/dt or G') greater than the response time of typical anti-G suit valves, leaving the pilot both unprotected for periods of time sufficient to cause unconsciousness, and causing unconsciousness due to a high onset rate of acceleration at G levels lower than the pilot could otherwise tolerate.

To solve this problem, the prior art has introduced a variety of approaches to improve anti-G suit valve response times. Standard anti-G suit valves are mechanical spring-mass controlled valves, providing pressurized air to the anti-G suit bladders at pressures proportional to acceleration along the z-axis. A standard modification to such inertially controlled valves has been to make a so-called ready pressure valve which preloads the anti-G suit bladders to about 2 psi, a pressure easily tolerated by a pilot without significant discomfort, to reduce the delay in filling the bladders to an effective pressure once inflation is triggered.

Other prior art approaches attempt to fill the bladders to an effective pressure before the onset of adverse G effects. They include mounting an electrically activated solenoid over the mass to move the mass (and its attached valve spindle) when an accelerometer and accompanying circuitry detects preselected levels of acceleration (G) and rate of change of acceleration (G'). A variation of that approach fully opens the anti-G suit valve for a preselected period of time when the solenoid is first triggered, so that full protection is provided to the pilot as quickly as possible, then backs off to allow normal inertially controlled proportional operation.

Another prior art approach has been to add microprocessor controlled circuitry to control the solenoid mounted over the mass and valve spindle. The microprocessor controlled circuit can monitor the aircraft data bus to trigger inflation after receiving a signal, such as joystick movement, indicating that a high G maneuver is imminent. The prior art has also proposed adding software to such microprocessor controlled circuits to apply preselected pressure profiles that will maximize the ability of pilots to tolerate high G forces.

Many of the prior art improvements to anti-G suit valves are retrofits to existing anti-G valves. They are intended to be failsafe so that, in the event of failure of the improvement, the anti-G suit valve will default to its normal inertial operation.

These prior art modifications to anti-G suit valves are valuable improvements. Unfortunately, particularly in the case of microprocessor controlled anti-G suit valves, the prior art valve mechanisms do not provide precise control of the actual air pressure in the bladders, thus preventing realization of many of the desired benefits.

It is, therefore, a principal object of the present invention to provide a anti-G suit valve system that combines the rapid response of prior art anti-G valves with more precise control over the pressure inside the anti-G suit.

It is another object of the present invention to make it a retrofit to existing anti-G suit valves.

It is a feature of the present invention that its retrofit to existing anti-G suit valves will be inexpensive and straightforward.

It is another feature of the present invention that it is completely failsafe in operation so that, in the event of any failure, it will fall back to normal inertial valve operation.

It is yet another feature of the present invention that it can incorporate all the advantages of prior art anti-G suit valves while still fulfilling all its objects.

It is an advantage of the present invention that its feedback feature allows precise control of anti-G suit bladder pressures with relatively imprecise valves.

SUMMARY OF THE INVENTION

The present invention provides an improvement to existing anti-G suit valves that substantially increases the preciseness with which the pressure within the bladders of an anti-G suit can be controlled, thereby substantially increasing the effectiveness of anti-G protection provided a pilot. The unique discovery of the present invention is that precise control of anti-G suit bladder pressure requires controlling the exhaust from the bladders, in addition to controlling the output from the anti-G suit valve to the bladders. Another unique discovery of the present invention is that the use of a feedback loop from the anti-G suit, combined with controlling the exhaust from (in addition to the input to) an anti-G suit, allows the individual valves to be relatively imprecise in their operation while still maintaining precise control of the pressure inside the anti-G suit. This advantage from the use of a feedback loop does not appear when only the input to the anti-G suit is controlled.

Accordingly, the present invention is directed to an anti-G suit valve system for controlling the delivery of pressurized air from a pressurized air supply to an anti-G suit, comprising inertially actuated first valve means for controlling the flow of pressurized air to the anti-G suit, electrically actuated second valve means for controlling the flow of pressurized air to the anti-G suit, and electrically actuated third valve means for controlling the exhaust of pressurized air from the anti-G suit. The electrically actuated second valve means may be operatively interconnected with the first valve means so that the second valve means, when electrically actuated, will override the inertial control of the first valve means and, when not electrically actuated, will not interfere with the inertial control of the first valve means. The electrically actuated third valve means may be normally open. The electrically actuated third valve means may comprise a solenoid having a plunger, a first bore for passage of the plunger, a second bore (for passage of pressurized air) intersecting the first bore, a piston positioned inside the first bore, a spring positioned inside the first bore on the opposite side of the piston from the plunger, and wherein the solenoid, the piston and the spring are positioned so that, at rest, the spring holds the piston away from the intersection of the first and second bores; and, so that actuation of the solenoid will move the plunger against the piston, moving the piston against the spring, and will move the piston against the spring to block the intersection of the first and second bores. The anti-G suit valve system of claim 1 may further comprise a controller for both the second and the third valve means and feedback control means for measuring the pressure inside the anti-G suit and using that measured pressure as an input to the controller.

The present invention is also directed to a method for controlling delivery of pressurized air from a pressurized air supply to an anti-G suit, comprising the steps of controlling with a first valve means the flow of pressurized air to the anti-G suit and simultaneously controlling with a second valve means the exhaust of pressurized air from the anti-G suit. The method may further comprise overriding the operation of inertially actuated valve means for controlling the flow of pressurized air to the anti-G suit. The method may also comprise measuring the pressure inside the anti-G suit and using that measurement as a feedback control input to a controller for the first and second valve means.

DESCRIPTION OF THE DRAWINGS

The present invention will be more clearly understood from a reading of the following detailed description in conjunction with the accompanying drawings wherein.

DETAILED DESCRIPTION

Figure 1:
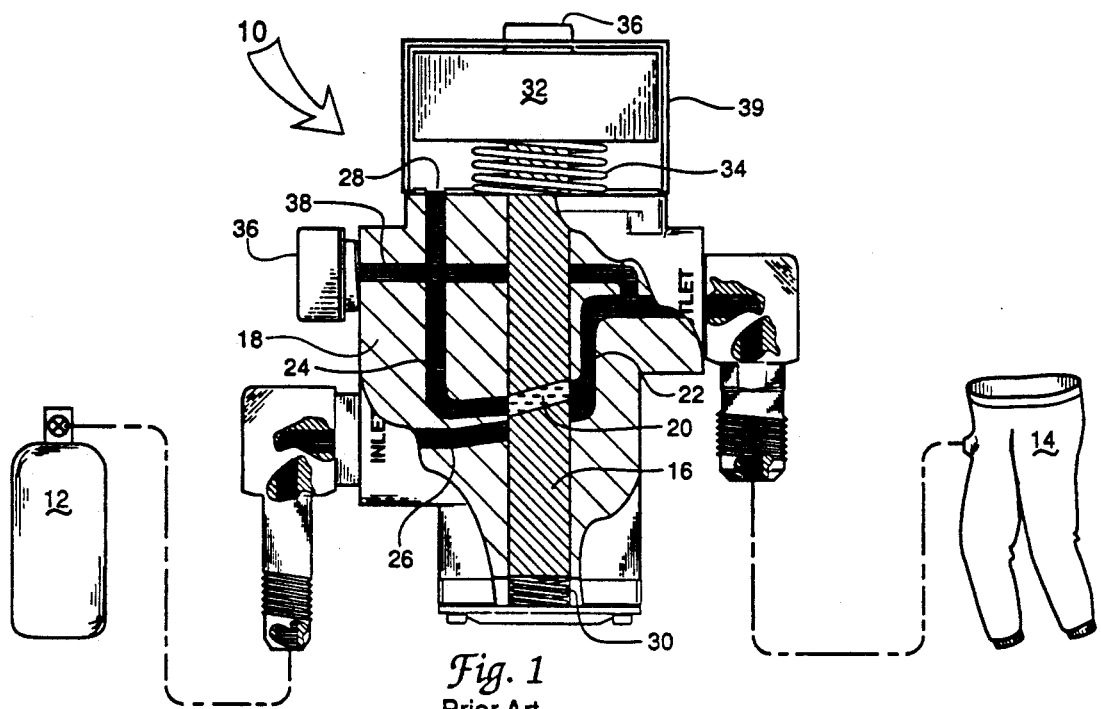
FIG. 1 is an exploded view of an example prior art mass-spring inertia anti-G suit valve.

Referring now to FIG. 1 of the drawings, there is shown an example schematic view of a prior art mass-spring inertia anti-G suit valve 10. Valve 10 controls the delivery of pressurized air from a pressurized air supply 12 to bladders inside an anti-G suit 14. An example of such an anti-G suit valve is a Hi Flow Model 14050 Anti-G suit valve available from Alar Products, Inc., Kent, OH, a part of Essex Industries, Inc., St. Louis, MO. The following description of the operation of anti-G suit valve 10 is very simplified for rapid understanding and is not intended to be identical to that of any particular prior art anti-G suit valve. The description of the exterior features of valve 10, and their interconnection with the present invention, is generally identical or similar to other prior art anti-G valves.

The primary element of anti-G suit valve 10 is valve spindle 16. As valve spindle 16 slides up and down inside a valve body 18, an angled bore 20 through spindle 16 alternately connects an outlet bore 22 with an exhaust bore 24 and inlet bore 26. The connections can overlap. Outlet bore 22 connects to anti-G suit 14. Inlet bore 26 connects to pressurized air supply 12. Exhaust bore 24 connects to a series of openings 28 (only one opening is shown in this simplified view) on the top of valve body 18. Valve spindle 16 rests on top of a spring 30. A mass weight 32 is attached to the top of valve spindle 16. A second spring 34 supports mass weight 32 above valve body 18. At rest, spindle 16 is positioned so that angled bore 20 connects outlet bore 22 to exhaust bore 24. The weight of mass weight 32 and the spring constant of springs 30 and 34 are selected so that as anti-G suit valve 10 accelerates upward at preselected rates of acceleration, or G's, the inertial resistance of mass weight 32 will slide spindle 16 down relative to valve body 18 and angled bore 20 will begin to connect inlet bore 26 to outlet bore 22, thereby beginning to fill the bladders of anti-G suit 14. The pressure inside the bladders of anti-G suit 14 will generally be proportional to the number of G's experienced by anti-G suit valve 10. A relief valve 36 is connected through a relief valve bore 38 to outlet bore 22 so that the pressure inside anti-G suit 14 cannot go above a preselected maximum value, generally about 12 psi. A push-to-test button 36 is mounted above mass weight 32 and a cover 39 covers mass weight 32 and spring 34. A series of openings (not shown) in cover 39 allow exhaust from openings 28 to reach the atmosphere.

Figure 2:
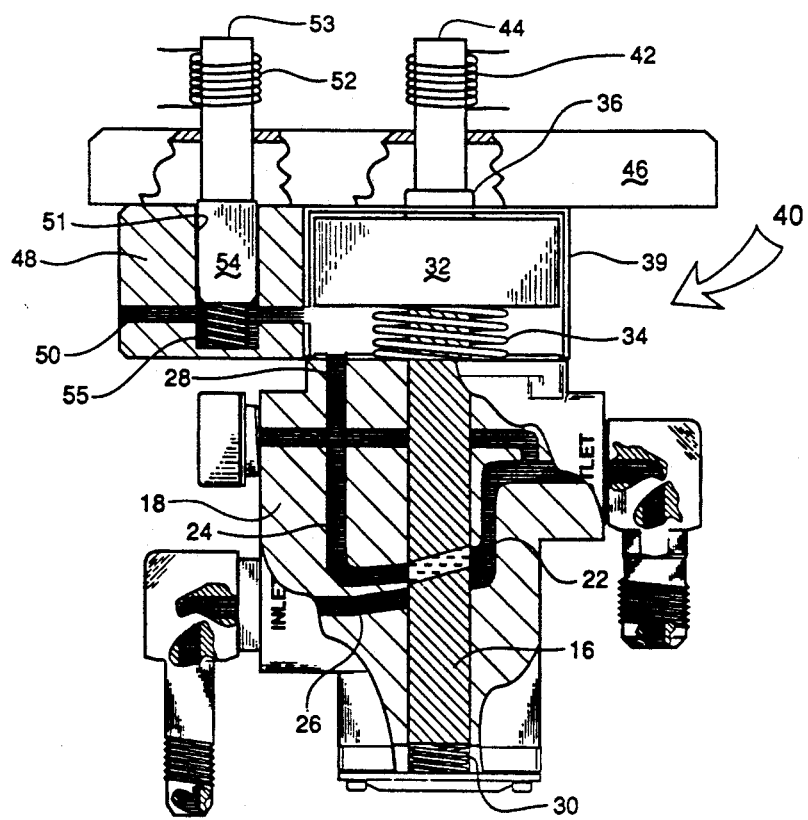
FIG. 2 is an exploded view of the prior art mass-spring inertia anti-G suit valve of FIG. 1 modified according to the teachings of the present invention; and, FIG. 3 is a schematic view of a preferred embodiment of the present invention as part of an anti-G suit system.

FIG. 2 shows the prior art anti-G suit valve 10 of FIG. 1 modified according to the teachings of the present invention to make an improved anti-G suit valve 40. An electrically actuated solenoid 42 is mounted over mass weight 32 so that downward movement of its solenoid plunger 44 will override the force of springs 30 and 34 and move valve spindle 16 down to connect inlet port 26 with outlet port 22. Solenoid 42 is mounted on a two-part housing 46 and 48 which attach and seal to the top of valve body 18 and to cover 39. Housing parts 46 and 48 cover most of the openings in cover 39. Those openings in cover 39 not covered by housing parts 46 and 48 are sealed with epoxy.

The exhaust from the remaining unsealed openings is rerouted through a cavity formed by cover 32, housing 48 and valve body 18 into a second exhaust bore 50. A second solenoid 52 and plunger 53 is mounted over exhaust bore 50 to control the flow through it by a piston 54 passing through a bore 51. Piston 54 is loaded by a spring 55 so that, in the absence of any electrical signal to solenoid 52, second exhaust bore 50 is normally open. The top of solenoid 47 extends above a cover (not shown) to substitute for press-to-test button 36.

Figure 3:
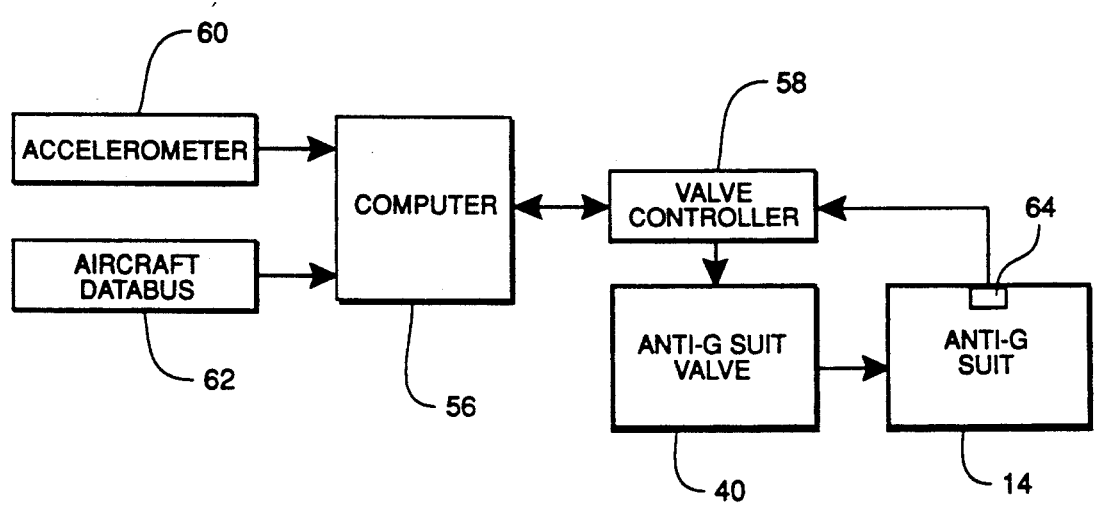

FIG. 3 is a schematic view of an anti-G valve 40 as part of a simplified preferred embodiment of an anti-G suit valve system. A micro-processor controlled computer 56 interconnects to a valve controller 58. Valve controller 58 represents schematically both exhaust solenoid 52 and spindle solenoid 42, along with their associated actuating electronics. Computer 56 also interconnects to an accelerometer 60 and to an aircraft data bus 62. A pressure transducer 64, or a series of pressure transducers, is mounted inside anti-G suit 14 and interconnects with valve controller 58 to provide a feedback loop. Those with skill in the art of the invention will readily see that the feedback loop may end at valve controller 58 or may extend further back to computer 56.

In operation, when a signal is received by computer 56 indicating imminent acceleration sufficient to create a danger of GLOC, solenoid 42 is activated to push down mass weight 32 and spindle 16 to begin delivery of pressurized air to anti-G suit 14. Computer 56 and valve controller 28, along with feedback signals from pressure transducer 64, work together to simultaneously control solenoid 42 and solenoid 52 for precise control of the pressures inside anti-G suit 14.

Experiments with the FIG. 3 embodiment have shown that the combination of controlling both input and exhaust with electrically actuated solenoids and a feedback loop permits very precise control of the pressures inside anti-G suit bladders even though the valves individually may not be capable of such precision, even if used with a feedback loop. This permits the use of less expensive and more robust valves.

Those with skill in the art of the invention will readily see other command inputs, in addition to an accelerometer or an aircraft data bus, may be provided to computer 56 to serve as an initiating event to trigger inflation of the anti-G suit bladders. Those additional command inputs could include a wide variety of time-to-go (TTG) signals and warning pulses for triggering a ready-pressure preload step, in addition to signals for triggering full inflation of the anti-G suit bladders before acceleration begins.

Those with skill in the art of the invention will see that a particular advantage of the present invention is that its more precise control of bladder pressures permits the advantageous use of different pressure profiles experimentally shown to enhance the G tolerance of pilots under different conditions. Before the present invention, pressure control inside the bladders was too imprecise to take advantage of new knowledge concerning the G-tolerance of pilots.

The disclosed anti-G suit valve successfully demonstrates controlling both input and exhaust of pressurized air from an anti-G suit to achieve more precise control of anti-G suit pressures and make realizable the advantages of other proposed modifications to anti-G suit systems. Though the disclosed use is specialized, it will find application in other areas where a variety of improvement modifications have been proposed, and even implemented, but full realization of their intended advantages will require more precise practical control over the actual physical process.

It is understood that certain modifications to the invention as described may be made, as might occur to one with skill in the field of the invention, within the intended scope of the claims. Therefore, all embodiments contemplated have not been shown in complete detail. Other embodiments may be developed without departing from the spirit of the invention or from the scope of the claims.

I claim:

1. An anti-G suit valve system for controlling the delivery of pressurized air from a pressurized air supply to an anti-G suit, comprising:
   (a) inertially actuated first valve means for controlling the flow of pressurized air to the anti-G suit;
   (b) electrically actuated second valve means for controlling the flow of pressurized air to the anti-G suit;
   (c) electrically actuated third valve means for controlling the exhaust of pressurized air from the anti-G 2. The anti-G suit valve system of claim 1, wherein the electrically actuated second valve means is operatively interconnected with the first valve means so that the second valve means, when electrically actuated, will override the inertial control of the first valve means and, when not electrically actuated, will not interfere with the inertial control of the first valve means.

3. The anti-G suit valve system of claim 1, wherein the electrically actuated third valve means is normally open.

4. The anti-G suit valve system of claim 1, wherein the electrically actuated third valve means comprises:
   (a) a solenoid having a plunger;
   (b) a first bore for passage of the plunger;
   (c) a second bore, for passage of pressurized air, intersecting the first bore;
   (d) a piston positioned inside the first bore;
   (e) a spring positioned inside the first bore on the opposite side of the piston from the plunger; and,
   (f) wherein the solenoid, the piston and the spring are positioned so that, at rest, the spring holds the piston away from the intersection of the first and second bores; and, so that actuation of the solenoid will move the plunger against the piston, moving the piston against the spring, and will move the piston against the spring to block the intersection of the first and second bores.

5. The anti-G suit valve system of claim 1, further comprising:
   (a) a controller for both the second and the third valve means; and,
   (b) feedback control means for measuring the pressure inside the anti-G suit and using that measured pressure as an input to the controller.

6. A method for controlling delivery of pressurized air from a pressurized air supply to an anti-G suit, comprising the steps of:
   (a) controlling with a first valve means the flow of pressurized air to the anti-G suit; and,
   (b) simultaneously controlling with a second valve means the exhaust of pressurized air from the anti-G suit.

7. The method for controlling delivery of pressurized air to an anti-G suit according to claim 6, further comprising overriding the operation of inertially actuated valve means for controlling the flow of pressurized air to the anti-G suit.

8. The method for controlling delivery of pressurized air to an anti-G suit according to claim 6, further comprising measuring the pressure inside the anti-G suit and using that measurement as a feedback control input to a controller for the first and second valve means.

* * * * *